United States Patent Office 3,325,344
Patented June 13, 1967

3,325,344
PROCESS AND LAMINATED STRUCTURES WHERE THE ADHESIVE IS THE COPOLYMER OF VINYL FLUORIDE AND ANOTHER VINYL COMPOUND
John R. Semancik, Mentor, and William A. Gallup, Painesville, Ohio, assignors to Diamond Alkali Company, Cleveland, Ohio, a corporation of Delaware
No Drawing. Filed Apr. 15, 1963, Ser. No. 272,883
15 Claims. (Cl. 161—218)

This invention relates to the preparation of novel polymeric compositions and, more particularly, it relates to vinyl fluoride copolymer compositions suitable as adhesives and to the process of obtaining them.

The invention will be described as it applies to improving adhesion of vinyl fluoride polymers when these materials are used as protective coating materials on a wide variety of substrates. The term "vinyl fluoride polymers" as used herein is intended to refer to homopolymers of vinyl fluoride or to copolymers containing vinyl fluoride as the major constituent, i.e., about 75 to 80 percent by weight of the copolymer, in combination with other fluorine-containing monomers, e.g., vinylidene fluoride, trifluoroethylene and the like. However, the invention is equally applicable to other polymers which can be employed as coating materials.

Vinyl fluoride polymers exhibit many attractive characteristics including good toughness and strength properties, excellent stability to light, good water impermeability and superior resistance to chemical attack. They have enjoyed considerable success as protective coatings for a wide variety of substrates such as metal, wood, leather, fabrics, various construction materials and the like. They may also be used to provide a protective surface coating for other polymers which exhibit less stability to light and are less resistant to water absorption and to chemical attack.

A well-known method for applying these polymers as protective coatings is to laminate a previously fabricated film or sheet of the polymer onto the particular substrate to be protected, said substrate having been primed or treated on the surface with a bonding agent to promote good adherence of the polymer film thereto. However, in practice, the good adherence desired has oftentimes been effected with difficulty due to inefficient bonding and poor adhesion properties of vinyl fluoride polymers, particularly to smooth surfaces. Thus the laminated film may soon exhibit "lifting" or loosening from the substrate.

Alternatively, protective polymer coatings have been applied by depositing onto the substrate a fluid polymer composition which is comprised of particles of polymer dispersed in an organic liquid medium. The coated substrate is then subjected to a heating cycle which fuses the polymer particles into a continuous coating. The organic liquid medium employed may be nonvolatile at the fusion temperature of the polymer, e.g., a plasticizer, or the liquid may be one which can be volatilized at the fusion temperature, such as a latent solvent. While adhesion of the coating obtained by a dispersion casting technique may be somewhat improved over film laminations, the maximum adhesion desired is usually not obtained.

An object of this invention, therefore, is to provide a composition which is suitable for use as an adhesive in effectively bonding or laminating a vinyl fluoride polymer film or sheet onto a substrate.

Another object of this invention is to provide a composition which, when incorporated in a dispersion of a particulate vinyl fluoride polymer used to prepare coatings by a dispersion casting technique, will effect improved adhesion of the formed polymer to the substrate.

A further object is to provide a composition which is useful as a contact adhesive, exhibiting maximum adherence to itself.

Still another object is to provide an adhesive composition for bonding effectively materials, such as metals, paper, wood, fabric, plastics, etc. either to themselves or to each other.

These objects are accomplished by polymerizing in the presence of a free radical catalyst and under superatmospheric pressure a monomeric mixture comprising as the major constituent, vinyl fluoride and, as the minor constituent, at least one unsaturated monomer selected from the group consisting of compounds represented by the structures.

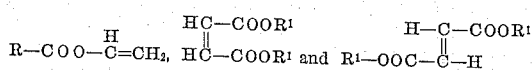

wherein R is an alkyl radical containing from 1 to 17 carbon atoms, and $R^1$ can be the same or different alkyl radicals containing from 1 to 8 carbon atoms.

More specifically, the present invention involves the preparation of vinyl fluoride copolymer compositions having excellent adhesive characteristics by polymerizing in an aqueous suspension polymerization process, a monomeric mixture containing, by weight, from 50 to 92 percent of vinyl fluoride in combination with from 8 percent up to 50 percent of at least one unsaturated monomer having the aforementioned structure, said process being conducted at a temperature within the range of about 40° to 125° C. and at a pressure of at least 3000 p.s.i.

The unsaturated monomers which may be copolymerized with vinyl fluoride to produce the adhesive compositions of this invention are (1) vinyl esters of saturated monobasic acids containing from 2 to 18 carbon atoms per molecule and (2) diesters obtained by reacting maleic or fumaric acid with saturated aliphatic alcohols containing from 1 to 8 carbon atoms per molecule. Suitable comonomers thus include vinyl actate, vinyl propionate, vinyl vinyl butyrate, vinyl valerate, vinyl caprocate, vinyl octoate, vinyl decanoate, vinyl dodecanoate, vinyl octodecanoate and the like; and dimethyl, diethyl, dipropyl, dibutyl, diamyl, diheptyl, and dioctyl maleates and fumarates.

To exhibit adhesive characteristics, the copolymers of this invention must contain at least 8 percent, by weight, of the particular comonomer employed as described above. In general, these products will contain about 50 to 92 percent, by weight of vinyl fluoride, and from 8 to 50 percent of the comonomer. These copolymer products are solid, white materials which may exhibit a slight tackiness or rubbery character depending upon the type and amount of comonomer present in proportion to vinyl fluoride. For example, if the comonomer is present in an amount above 20 percent, by weight, the copolymer product generally will be of a rubbery nature. The copolymers are of medium to high molecular weight, having an inherent viscosity within the range of about 0.5 to 3, as measured in N,N-dimethyl acetamide at 110° C. The inherent viscosity is determined by dissolving the polymer in N,N-dimethyl acetamide at 110° C. and measuring, at this temperature, the viscosity of the solution relative to that of the N,N-dimethyl acetamide obtained in the same manner. The time of efflux through a viscometer is measured for the solvent and for the solution of polymer in the solvent. The concentration of polymer in the solution is 0.1 g. per 100 ml. of solvent. The inherent viscosity is then calculated as follows:

$T_0$=solvent flow time in seconds
$T_1$=solution flow time in seconds $$\text{Relative viscosity} = \frac{T_1}{T_0}$$

$$\text{Inherent viscosity} = \frac{\text{Natural logarithm of relative viscosity}}{C}$$

where C is the concentration as expressed in grams of polymer per 100 ml. of solvent.

The copolymers of this invention can be effectively applied in a variety of ways to provide the good adhesion and bonding properties desired. They may be applied as hot melt adhesives in laminating vinyl fluoride polymer films onto various substrates, e.g., metals, such as steel or aluminum, or shaped structures of other polymers, or in bonding together materials, such as metals, glass, shaped polymer structures and the like. In this method, the copolymer, in solid form, is applied to the surface of one of the structures to be bonded. The second structure is then superimposed on the coated surface of the first structure, forming a composite construction, with the copolymer interposed between the structures. Heat and pressure are then applied to the composite construction for a sufficient time to melt the copolymer and promote the bonding process. In preparing film laminations by using this technique, it should be noted that the copolymers of this invention can also be effectively used with polymers other than vinyl fluoride polymers as long as they will fuse and impart the desired adhesive force at a temperature which is substantially less than the deformation temperature of the polymer film, or films. The copolymers of this invention are readily soluble in various solvents, such as, for example, paraffinic hydrocarbons, lower alkyl esters and ketones. Alternatively, therefore, they may be applied to the surface of one material to be bonded, e.g., the polymer film surface, or to the second surface, e.g., the substrate, or to both surfaces from solution, being applied by any suitable means, such as by brushing, knife coating, spraying and the like. Normally, it is preferred (but not necessary) to drive off the solvent from the copolymer layer so that this layer is a substantially homogeneous coating upon one or the other, or both, of the surfaces to be laminated together. The surfaces thus coated are then joined together and lamination is effected by applying to the composite structure sufficient heat and pressure to liquify the copolymer and promote adhesion.

The copolymers of this invention also improve the adhesion of polymeric coatings which are prepared from dispersions of a particulate polymer in an organic liquid medium, such as a latent solvent. In this application, the copolymer composition is employed dissolved in minor amounts, i.e., about 0.5 to 5 percent, by weight, in the solvent.

Being readily soluble in common solvents, the copolymers of this invention may also be employed in laminating operations as contact adhesives, exhibiting maximum adhesiveness or bonding to themselves. In this method of application, a solution of the particular copolymer employed is prepared in a suitable solvent. The concentration of copolymer in the solution may vary from about 20 percent up to 70 percent, depending upon the molecular weight of the copolymer employed and the comparative thickness or viscosity desired in the solution. The resultant solution is then applied by suitable means onto the surfaces of the materials to be laminated. When a substantial amount of the solvent has been removed by evaporation from the copolymer layers, the coated surfaces are joined together and a strongly adherent laminate is obtained.

In preparing the copolymer compositions of this invention catalysts which generally may be employed are vinyl polymerization catalysts, i.e., those compounds which induce polymerization by free-radical generation. These materials include organic peroxy compounds such as acyl and diacyl peroxides, e.g., lauroyl peroxide, benzoyl peroxide, dibenzoyl peroxide, benzoyl acetyl peroxide and the like; dialkyl peroxides, e.g., diethyl peroxide or dipropyl peroxide; inorganic peroxides, such as hydrogen peroxide; azo compounds and water soluble salts of inorganic peroxy acids, such as potassium persulfate, ammonium persulfate, potassium percarbonate and the like. In practice, the preferred catalysts are the lyophilic, i.e., monomer-soluble or water-insoluble catalysts, with the acyl peroxides, e.g., benzoyl peroxide and lauroyl peroxide, being especially preferred. The effective amount of catalyst which can be used to initiate the copolymerization may be as low as 0.005 percent, by weight of the total monomer mixture used. However, in the process of this invention the catalyst is used preferably in an amount within the range of 0.05 to 1 percent, based on the total weight of the monomer mixture. The process of this invention may generally be conducted at temperatures within the range of 40° to 125° C. To obtain the copolymer product having the best thermal stability and most desirable processing characteristics the reaction is preferably carried out at a temperature within the range of 50° to 85° C. As polymerization is carried out in an aqueous suspension system, superatmospheric pressure is necessarily employed. In general, the reaction may be conducted at a pressure in excess of 3,000 pounds per square inch. The preferred pressures employed, however, are within the range of 5,000 to 10,000 pounds per square inch.

The vinyl fluoride copolymer compositions of this invention may be obtained from a batch process or may be produced by a continuous process. One or more of the reactants may be added portionwise or continuously during the polymerization and the reactor can be discharged at intervals. The pressure can be maintained constant or within the desired range by continuously or intermittently injecting either vinyl fluoride or either one or more of the other reaction components during the reaction. Alternatively, a reactant mixture can be passed continuously through one or through a plurality of chambers maintained at the reaction conditions and provided with agitation means. In producing the copolymer of this invention, a continuously operated process offers advantages such as close control of the reaction and of the proportions of the reactants used and, most importantly, speed and economy of operation.

As described hereinbefore, the copolymer of this invention may contain in combination with vinyl fluoride, from about 8 percent up to 50 percent, by weight of the copolymer, of a comonomer having the structure as set forth previously. The preferred copolymer contains from about 8 percent to about 20 percent of comonomer, by weight, since this composition exhibits maximum thermal stability and can thus be employed effectively to bond clear polymer films without yellowing or showing other evidence of thermal degradation.

In order that those skilled in the art may better understand the present invention and the manner in which it may be carried out it will be further illustrated by detailed description in the following specific examples. In these examples and elsewhere herein where proportions of ingredients are expressed in parts, such proportions are by weight.

*Example 1*

An agitated, stainless steel autoclave is charged with 400 parts distilled, deaerated water, 0.4 part of lauroyl peroxide and 0.2 part of methocel 60 HG-50 (a Methylated cellulose product of Dow Chemical Company) which is introduced as a 5 percent solution in water. The autoclave is then closed, cooled to 0° C. and evacuated for 15 minutes. While agitation is continued, the reactor is then charged with 10 parts of dibutylmaleate and 190 parts vinyl fluoride. The autoclave and its contents are then warmed to a temperature of 65° C. Thereafter, the reaction is maintained for 10 hours at this temperature and maintained under a pressure of 5000 p.s.i. by injecting water into the autoclave, as required. The autoclave is then cooled and the contents discharged. The reaction mixture is filtered to separate the polymer, which is then washed and dried. Thirty parts of a dry particulate copolymer is obtained, which is found, by F analysis, to contain 33.6 percent dibutyl maleate and 66.3 percent vinyl fluoride. It has an inherent viscosity of 0.5 as measured in N,N-dimethyl acetamide at 110° C.

A portion of the copolymer product is placed between two aluminum sheets and pressed between heated platens of a laboratory arbor press for 5 minutes at 425° F. The aluminum sheets are then quickly cooled by quenching in a water bath. The sheets cannot be pulled apart without tearing, indicating that the copolymer product of this example is efficient as a hot-melt adhesive for metal.

*Example 2*

In this example, a copolymer is prepared following the same procedure as outlined in Example 1, employing a monomeric mixture composed of 10 parts vinyl decanoate and 190 parts vinyl fluoride. The reaction is conducted for a period of 10 hours. One-hundred-forty-four parts of a dry, particulate copolymer is recovered, which contains 9 percent vinyl decanoate and has an inherent viscosity of 1.85. This product is heat pressed between aluminum sheets as in Example 1. In the metal laminate obtained, the sheets cannot be pulled apart, the copolymer serving as an efficient bonding adhesive.

*Example 3*

In this example the excellent adhesive character of a copolymer of this invention is illustrated by incorporating the copolymer in a polymer dispersion employed to prepare coatings by a dispersion casting technique. The copolymer product of Example 1 is dissolved in N,N-dimethyl acetamide to give a solution containing 1 percent of the copolymer, by weight. Sufficient, dry particulate vinyl fluoride homopolymer is dispersed in the prepared solution to prepare a dispersion containing 20 percent solids, by weight. This dispersion is then spread on an anodized aluminum sheet by means of a doctor knife. The coated sheet is then heated in the oven at 425° F. for 4 minutes. The adhesion of the polyvinyl fluoride coating obtained exhibits significantly improved adhesion to the metal by comparison to a similar coating prepared from a dispersion of vinyl fluoride homopolymer in N,N-dimethyl acetamide alone.

In addition to vinyl fluoride polymers, the copolymer compositions of this invention, as described herein, may be employed to bond shaped structures, such as films, of homopolymers of other unsaturated monomers and copolymers thereof wherein the unsaturated monomer is the major constituent. Such specific polymers and classes of polymers include acrylonitrile homopolymers and copolymers containing acrylonitrile with, e.g., methyl acrylate or ethyl acrylate; polyacrylic and polymethacrylic esters; vinylidene fluoride polymers; vinylidene chloride polymers, polyethylene; polyvinyl acetate; polyvinyl ethers; polyvinyl acetals; polyvinyl chloride and interpolymers of vinyl chloride with vinyl esters, acrylonitrile and the like.

What is claimed is:

1. A process for laminating structures one to the other which comprises applying to a surface of at least one of the structures a copolymer composition comprising the polymerization product of a mixture of vinyl fluoride and at least one other unsaturated monomer selected from the group consisting of compounds having the structure

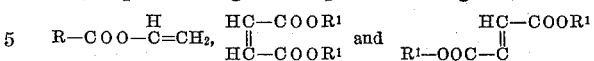

wherein R is an alkyl radical containing 1 to 17 carbon atoms, and $R^1$ is the same or different alkyl radical containing 1 to 8 carbon atoms, said copolymerization product having an inherent viscosity of at least 0.5 and containing, by weight, from 50 percent to 92 percent of vinyl fluoride and from 8 percent up to 50 percent of at least one of the said unsaturated monomers; superimposing on the coated surface of the first structure the structure to which it is to be laminated, forming a composite construction with the composition interposed between said structures; and applying heat to said composite construction to liquify the composition and bond the structures together.

2. The process of claim 1 in which a vinyl fluoride polymer film is laminated to a metal surface.

3. The process of claim 2 in which the vinyl fluoride polymer is polyvinyl fluoride.

4. A process for improving the adhesion of a coating of a thermoplastic polymer applied to a substrate by casting thereon a dispersion of particles of said polymer dispersed in an organic liquid and then fusing the polymer particles so deposited to form the coating, which process comprises incorporating in the polymer dispersion, prior to casting, a minor amount of a copolymer composition comprising the polymerization product of a mixture of vinyl fluoride and at least one other unsaturated monomer selected from the group consisting of compounds having the structure

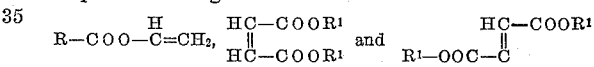

wherein R is an alkyl radical containing 1 to 17 carbon atoms, and $R^1$ is the same or different alkyl radical containing 1 to 8 carbon atoms, said copolymerization product having an inherent viscosity of at least 0.5 and containing, by weight, from 50 percent to 92 percent of vinyl fluoride and from 8 percent up to 50 percent of at least one of the said unsaturated monomers, said composition being dissolved in the organic liquid.

5. The process of claim 4 in which the thermoplastic polymer dispersed in the organic liquid is a vinyl fluoride polymer and the substrate is a metal.

6. A process for laminating structures one to the other which comprises applying on one surface of each structure to be bonded, a layer of a copolymer composition comprising the polymerization product of a mixture of vinyl fluoride and at least one other unsaturated monomer selected from the group consisting of compounds having the structure

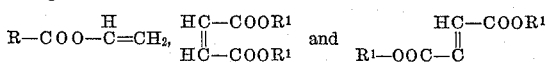

wherein R is an alkyl radical containing 1 to 17 carbon atoms, and $R^1$ is the same or different alkyl radical containing 1 to 8 carbon atoms, said copolymerization product having an inherent viscosity of at least 0.5 and containing, by weight, from 50 percent to 92 percent of vinyl fluoride and from 8 percent up to 50 percent of at least one of the said unsaturated monomers dissolved in an organic solvent therefor, evaporating substantially all of the solvent from said layers of the composition, and joining together the coated surfaces of the structures to form the lamination.

7. The process of claim 1 wherein the copolymer composition contains, by weight, from 80% to 92% of vinyl fluoride and from 8% up to 20% of at least one of said unsaturated monomers.

8. The process of claim 1 wherein the unsaturated monomer of the copolymer composition is a vinyl ester of a saturated monobasic aliphatic acid having from 2 to 18 carbon atoms per molecule.

9. The process of claim 8 in which the unsaturated monomer is vinyl propionate.

10. The process of claim 1 wherein the unsaturated monomer of the copolymer composition is a dialkyl ester of an unsaturated dibasic aliphatic acid.

11. The process of claim 10 in which the unsaturated monomer is dibutyl maleate.

12. A laminated structure comprising a first structure and a second structure, the inner surfaces of said first and second structures continuously bonded to each other by means of an adhesive composition comprising the copolymer of the polymerization product of a mixture of vinyl fluoride and at least one other unsaturated monomer selected from the group consisting of compounds having the structures

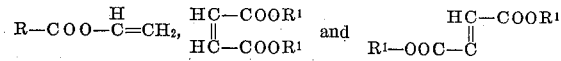

wherein R is an alkyl radical containing 1 to 17 carbon atoms, and $R^1$ is the same or different alkyl radical containing 1 to 8 carbon atoms, said copolymerization product having an inherent viscosity of at least 0.5 and containing, by weight, from 50 percent to 92 percent of vinyl fluoride and from 8 percent up to 50 percent of at least one of the said unsaturated monomers.

13. The laminated structure of claim 12 wherein the bonded surface of the first structure is metal.

14. The laminated structure of claim 12 wherein the second structure is a film of a vinyl fluoride polymer.

15. The laminated structure of claim 14 wherein the vinyl fluoride polymer film is a polyvinyl fluoride film.

References Cited
UNITED STATES PATENTS

| | | |
|---|---|---|
| 2,231,471 | 2/1941 | Hill _____ 161—254 X |
| 2,419,008 | 4/1947 | Coffman et al. _____ 260—88 |
| 2,431,056 | 11/1947 | Loudenslager et al. __ 161—254 X |
| 2,464,826 | 3/1949 | Neher et al. _____ 161—254 |
| 2,700,630 | 1/1955 | Burkey et al. _____ 156—231 X |
| 2,788,306 | 4/1957 | Cox et al. _____ 161—254 X |
| 2,921,045 | 1/1960 | DiMartino _____ 161—254 X |
| 2,979,480 | 4/1961 | Piloni et al. _____ 260—41 |
| 3,153,684 | 10/1964 | Bryan et al. _____ 264—80 |

EARL M. BERGERT, *Primary Examiner.*

C. B. COSBY, *Assistant Examiner.*